Patented Dec. 19, 1939

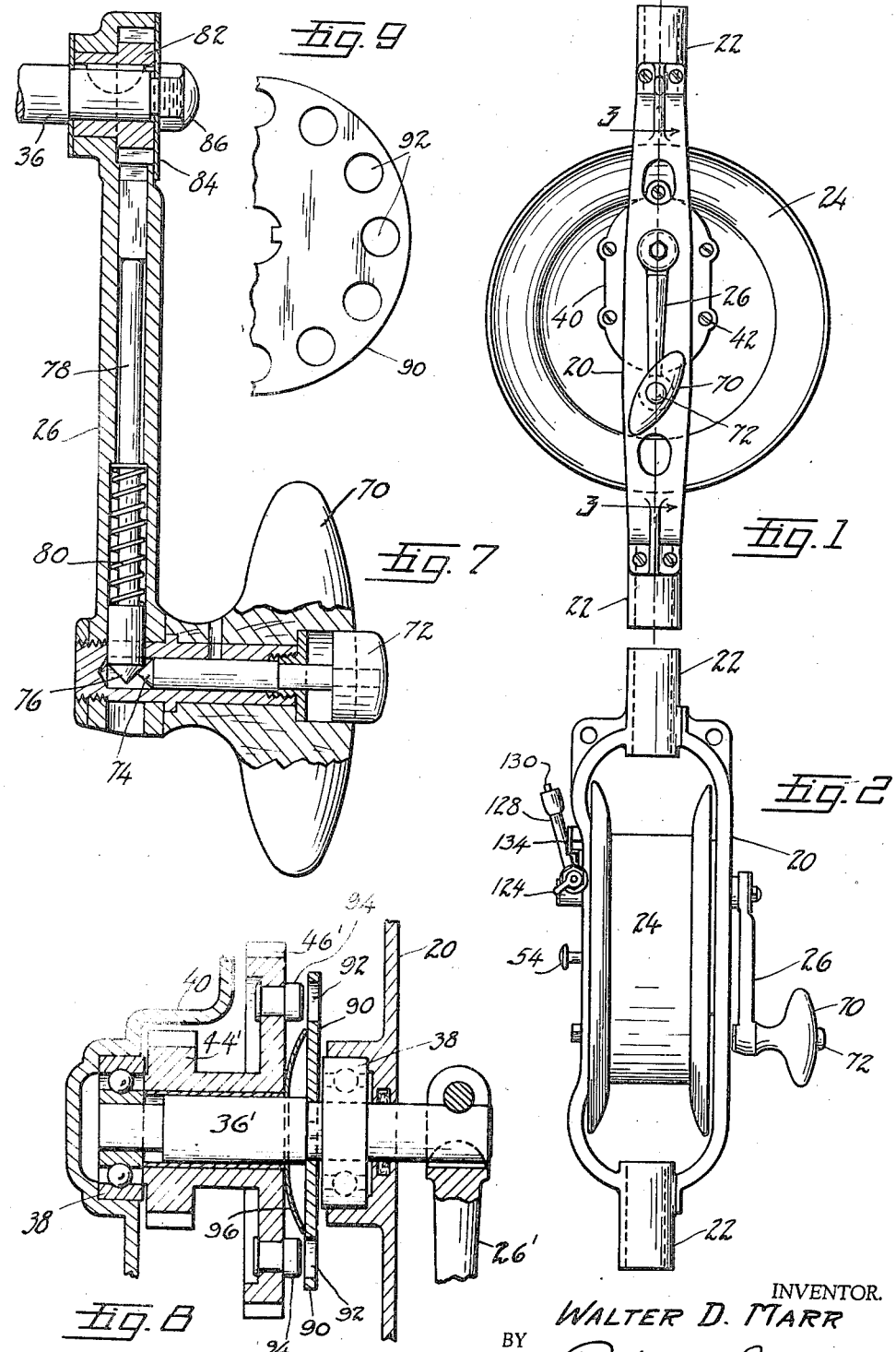

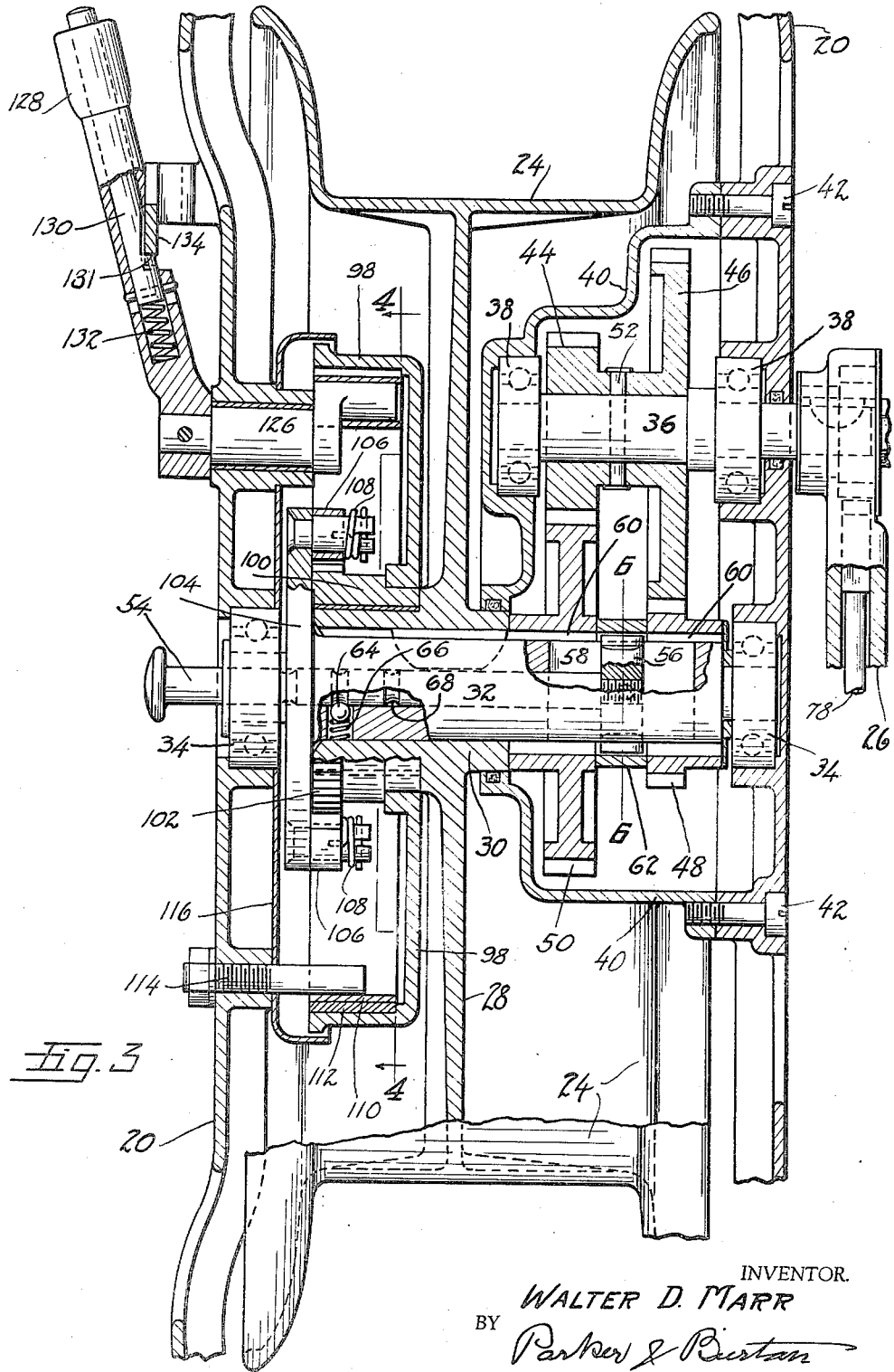

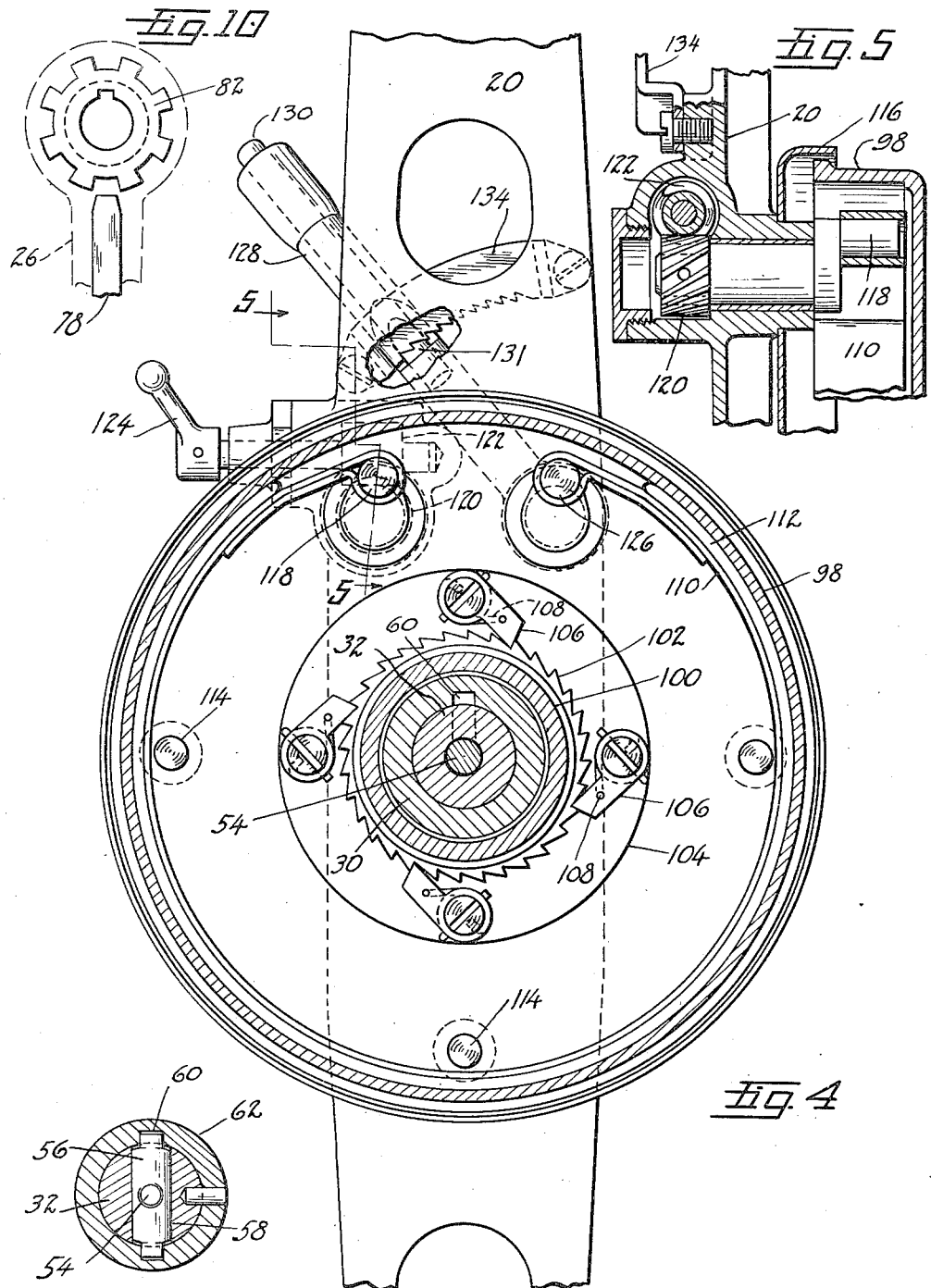

2,184,149

UNITED STATES PATENT OFFICE 2,184,149

FISHING REEL

Walter D. Marr, Flint, Mich.

Application March 7, 1938, Serial No. 194,336

11 Claims. (Cl. 242—84.7)

My invention relates to improvements in fishing reels and particularly reels designed for deep sea fishing.

An object is to provide a reel of strong, sturdy, simple construction provided with improved change speed driving mechanism whereby the rate of winding in the spool or drum may be varied for a given speed of rotation of the manual handle and provided with improved brake mechanism whereby the brake may be set to impose a selected determined drag upon the rotation of unwinding of the drum when the line is being drawn out but which brake mechanism does not impose any drag upon the winding of the drum to draw the line in.

A meritorious characteristic is that the brake mechanism and the change of speed gearing is each completely enclosed. One is positioned upon one side of the spool or drum and the other is positioned on the opposite side and substantially in line therewith. The brake is subject to control of adjustment and application from that side of the reel opposite the side on which the handle is located so that the operator may keep one hand on the handle and the other hand upon the brake control.

An important feature of the brake mechanism is that the brake friction means comprises an internal brake band having one end provided with adjustment mechanism whereby the position of the band with respect to the brake drum may be varied as desired and having the other end provided with a brake applying lever whereby the brake may be adjustably set to impose a selected frictional resistance upon the rotation upon winding of the spool and control may at all times be exercised thereover. The brake band is positioned within a drum and a meritorious characteristic is that means is provided to automatically couple the brake drum with the winding drum when the winding drum is being rotated in the unwinding direction, which mechanism is ineffective to accomplish such coupling when the winding drum is being rotated in the winding direction. By "winding" direction is meant that direction of rotation of the drum which draws the line in. By "unwinding" is meant that direction of rotation of the drum upon the drawing out of the line.

Another important feature is that the construction of the reel is such that when the line is running out with the winding drum rotating in the unwinding direction, the handle may be stationary. The handle may be stationary even though the gears are in mesh and rotating or the selector key which controls the gear selection may be positioned to disengage the gears from their driving connection with the gear change mechanism being put in neutral. In other words, the driving gears may be engaged for driving or the handle may be immobilized regardless of whether the change speed gears are connected for driving or in neutral, and the change speed gears may be in neutral or in driving arrangement regardless of whether the handle is connected for driving or disconnected.

Other objects, advantages, and meritorious features of my invention will more fully appear from the following specification, appended claims, and accompanying drawings, wherein:

Figure 1 is a side elevation of a reel embodying my invention,

Fig. 2 is an elevation of the same reel taken at a 90° angle with respect to Fig. 1, Fig. 3 is a vertical sectional view taken on line 3—3 of Fig. 1 but showing the structure enlarged, Fig. 4 is a sectional view taken on line 4—4 of Fig. 3, Fig. 5 is a sectional view taken on line 5—5 of Fig. 4, Fig. 6 is a sectional view taken on line 6—6 of Fig. 3, Fig. 7 is a sectional view through the manually operable handle showing the clutching mechanism, Fig. 8 is a sectional view through a modified type of handle mechanism, Fig. 9 is a fragmentary elevation of a portion of the locking mechanism of Fig. 8, and Fig. 10 is a fragmentary elevation of a portion of the locking mechanism of Fig. 7.

The embodiment of my invention illustrated in the drawings includes a framework 20 for the reel which may be provided at each end with a socket 22 to receive a pole or support. There is rotatably supported within this framework a spool or winding drum 24 and a manually operable handle 26 is provided to actuate the drum. The fishing line is secured to the drum in any conventional manner and the drum is provided with relatively wide flaring flanges as particularly illustrated in Figs. 2 and 3 to carry a line of substantial length. As the reel is designed for deep sea fishing or large game fish it is of strong, sturdy construction. The winding drum or spool 24 has a web 28 which terminates in a hub portion 30, which hub is keyed to a shaft 32 by a key such as shown in dotted outline in Fig. 3 so as to rotate with the shaft. The shaft may be supported at opposite ends within ball bearings 34 upon the frame.

The shaft is adapted to be driven at varying rates of speed from the handle 26 through a change speed gearing illustrated in Fig. 3. The handle 26 is adapted to be detachably coupled in a manner hereinafter more particularly described with a driving shaft 36 to drive the same. This driving shaft may be rotatably supported within bearings 38 mounted in a housing indicated generally as 40 and formed of two sections held together by screws 42 or in any other suitable manner. This housing encloses the gear change mechanism and is made tight so that the gears may run in lubricant. Fixed upon the shaft 36 is a small gear 44 and a large gear 46. The large gear 46 meshes with a relatively small gear 48 on the winding drum shaft 32 and the small gear 44 meshes with a large gear 50 mounted on the winding drum shaft.

The gears 44 and 46 are shown as pinned at 52 or otherwise fixed upon the shaft 36. The gears 48 and 50 are shown as freely rotatable upon the shaft 32 but adapted to be selectively coupled therewith as desired through the employment of a selector key 54. This key extends axially through the shaft 32. It is provided with a handle at its outer end. At its inner end it is provided with a locking portion 56 shown in Fig. 3 and in detail in Fig. 6. This locking element extends through a diametric slot 58 formed in the shaft 32 and of a length to permit reciprocation of the locking element 56 to pick up either gear 48 or gear 50. These gears are provided with slots 60 in their hubs so that the locking element 56 may be shiftable thereinto to pick up and key either gear to the shaft 32 to rotate therewith. In Fig. 3 the locking element 56 is shown in the neutral position within a key-way formed in the collar 62, which is a spacer collar between the two gears 48 and 50 which provides a neutral position for the gear mechanism. In Fig. 3 the gear mechanism is in neutral.

A ball 64 is held by spring 66 to engage in any one of a plurality of grooves 68 which extend about the selector key 54 as shown in Fig. 3 so as to hold the selector key at either of the three selected positions. It is apparent that this key may be actuated by the left hand of the operator of the reel and the operator may keep the right hand upon the winding handle so as to at all times have the reel under control to either allow the line to run out or to draw the line in.

Two types of handle mechanisms are illustrated. One is illustrated in Figs. 7 and 10. The other is illustrated in Figs. 8 and 9. The handle generally is indicated as 26. It has an egg shaped hand grip portion 70. In the construction of Fig. 7 this is shown as carrying a button plunger device 72 which is tapered as at 74 at its inner end to engage against the tapered end 76 of a plunger 78 which is held to the position shown in Fig. 7 by a spring 80. The opposite end of this plunger 78 is shaped to engage a toothed wheel 82. This wheel 82 is mounted upon the shaft 36 as shown in Figs. 3, 7 and 10. It is shown in these figures as keyed thereon. A cover plate 84 extends thereover and is held in place by a nut 86. When the plunger 78 is under the control of the spring and pressure is released from the button 72 the plunger occupies the position shown in Figs. 7 and 10 and is out of engagement with the wheel 82 and the handle is disconnected on the shaft 36. Upon depression of the button 72 plunger 78 is urged into engagement with the toothed wheel 82 so that the handle is locked to rotate the shaft and the gears 44 and 46 mounted on the shaft and through these gears to rotate the gears 48 and 50 on the winding drum shaft.

In Figs. 8 and 9 a modified type of handle structure is shown. The handle element 26' is keyed to the shaft 36' but the gears 44' and 46' are free upon such shaft. There is a plate 90 provided with circumferentially spaced apertures 92 which are adapted to receive lugs or pins 94 carried by the web of the gear 46' so as to pick up this gear for rotation. The gear 46' is integral with the gear 44', which gear 44' is thus picked up for rotation. There is a dish-shaped spring 96 mounted upon the shaft 36' which normally holds the shaft outwardly so that the gears 44' and 46' are free as shown in Fig. 8. The shaft has a permitted axial movement which will permit the gears to be picked up as the shaft is pushed inwardly by the handle.

In each of these constructions of Fig. 7 or 8 it will appear that the handle may be coupled as desired with the change speed gearing to drive the same or the handle may be disconnected therefrom so as to remain stationary while the gears rotate.

This feature is of importance in that if the line is being drawn out and the gears are in mesh it is possible to hold the handle stationary and leave the gears in mesh, or if desired the gears may be put in neutral so that the handle can be held connected. The operator at all times has the choice of control as he may desire.

The reel is provided with brake mechanism which is positioned on the opposite side of the spool from the change speed gear mechanism. It is noted that the change speed gear housing and the change speed gears are located substantially in line with the winding drum on one side and that the brake mechanism is mounted substantially in line with the winding drum on the opposite side. The brake mechanism is completely enclosed as is the change speed gearing. The brake mechanism is illustrated particularly in Figs. 3, 4 and 5.

It comprises a brake drum 98 mounted upon the hub 30 of the winding drum 24. This brake drum has a hub portion 100 upon which it is fixed and this hub portion has a ratchet wheel portion 102 shown particularly in Fig. 4. The winding drum shaft 32 has fixed thereupon to rotate with the shaft a disc 104 shown in Figs. 3 and 4. This disc carries a plurality of ratchets or dogs 106 held by springs 108 to engage in the ratchet teeth of the wheel 102 in one direction of rotation but to ride freely thereover in the opposite direction of rotation. It will appear, therefore, that when the disc 104 which is carried by the winding drum shaft 32 is rotated in the direction to unwind the line 24 the ratchet teeth 106 will be picked up so that the brake drum 98 will be rotated therewith. In the opposite direction of rotation the dogs will ride over the ratchet teeth and the brake drum will remain stationary.

The brake friction mechanism within the drum comprises a brake band 110 carrying a suitable facing 112 and generally supported by positioning pins 114 carried by the framework of the reel, which positioning pins also may hold the backing plate 116. This backing plate closes over the edge of the brake drum 98 so as to form a tight enclosure.

The brake band is supported at each end upon an eccentric mounted in the framework. The eccentric at one end of the band is indicated as 118. It has a reduced portion over which the band is secured as shown in Figs. 3 and 5. It has a bearing in the framework as shown in Fig. 5 and at its outer end it carries a worm gear 120 which is in mesh with worm 122. This worm or screw 122 is provided with a handle portion 124 whereby it may be actuated so as to move this end of the band toward or away from the drum. This provides an adjustment for the band whereby its position with respect to the inner surface of the drum may be fixed as desired. It may be set so as to come into play very quickly and so the amount of movement is very small, or it may be set further away.

The opposite end of the band is likewise mounted upon an eccentric which is indicated as 126. This is shown in Figs. 3 and 4. This eccentric also has a bearing in the framework. It has an off center reduced end portion to which the band is secured as shown in Fig. 3 and operating handle 128 surfaced on the outer end of the eccentric. This operating handle carries a spring control plunger 130. The spring is indicated at 132. The handle 128 is cut away on one side and the plunger is provided with a tooth 131 adapted to engage in a tooth quadrant 134 indicated in Figs. 3 and 4 so that the lever may be moved to different adjusted positions to apply the brake. It is apparent that the spring will hold the lever to any position to which it is adjusted but that it is available for shifting from one position to another at any time as desired.

The screw adjustment on the one end of the brake band permits a very fine adjustment for setting the brake for use. The lever 128 permits the brake to be set at whatever position is desired for locking engagement with the drum to impose the desired frictional retardation upon the rotation of the brake drum. This frictional drag may be set for the particular type of fish to be handled by the reel. Preferably it would not be a snubbing action but would be one designed to impose a substantial drag while permitting the line to be played out. It is apparent the amount of drag can be increased at any time through manipulation of the handle. It is also apparent as heretofore described that the winding handle may be stationary while the drum is unwinding and whichever change speed gear is thought desirable may be connected for driving so that whenever it is desired to wind in the line the operator has immediate control for doing so.

What I claim is:

1. A fishing reel comprising a winding drum, winding mechanism including a handle and change speed gears coupled with the drum to wind the same, selector means operable to selectively couple the gears with the drum for winding or disengage the driving engagement of the gears with the drum, brake mechanism effective to retard the unwinding rotation of the drum but ineffective to retard its winding rotation, means carried by the handle operable to connect or disconnect the handle from driving engagement with said gears, mechanism including a brake lever manually operable to set the brake to impose a predetermined resistance to unwinding rotation of the drum, and means carried by the lever operable to release or change said setting.

2. In a fishing reel, a frame, a winding drum having a shaft rotatably supported within the frame, winding mechanism including a handle and change speed gears coupled with the drum to wind the same, selector means including a key movable axially through the shaft of the winding drum operable to selectively couple the gears with the drum for winding or to disengage the driving connection of the gears with the drum, handle mechanism operable to engage said gears for winding or to be disengaged therefrom, brake mechanism including a brake drum surrounding said shaft, mechanism automatically operable to couple the brake drum with the shaft to rotate therewith on unwinding rotation of the winding drum but ineffective to couple the brake drum with the shaft upon winding rotation of the winding drum, and mechanism operable to adjustably set said brake to impose a determined drag upon rotation of the winding drum during winding.

3. In a fishing reel, a frame, a winding drum having a shaft freely rotatably supported upon the frame, change speed gears freely rotatably supported upon said shaft, a selector key operable axially through said shaft to couple each of said change speed gears to rotate with the shaft or to disengage the gears therefrom, handle mechanism including a handle and a shaft, change speed gear on said handle shaft meshing with the change speed gears on the winding drum shaft, and means operable to couple the change speed gears on the handle with the handle shaft to rotate the same or to disengage the handle therefrom.

4. In a fishing reel, a framework, a winding drum having a shaft journalled upon the framework for free rotation, change speed gears upon said shaft to rotate therewith or to permit the shaft to rotate independently thereof, selector means operable to selectively couple each of said gears with the shaft to rotate therewith or to disconnect the same therefrom to permit independent rotation of the shaft, handle mechanism including a handle and a driving shaft, cooperating change speed gears on said driving shaft in mesh with the change speed gears on the winding drum shaft, and means operable to couple the handle with the change speed gears on the drive shaft to drive the same or to disconnect the handle from driving engagement therewith.

5. In a fishing reel, a framework, a winding drum having a shaft journalled thereupon, change speed gears upon said shaft, selector means operable to selectively couple each of said gears with the shaft or to disconnect the same therefrom, handle mechanism including a handle and a driving shaft, cooperating change speed gears on said driving shaft in mesh with the change speed gears on the winding drum shaft, means operable to couple the handle with the change speed gears on the drive shaft to drive the same or to disconnect the handle therefrom, a brake drum supported upon said winding drum shaft to permit the shaft to rotate independently thereof upon winding rotation, means operable automatically to couple the brake drum with the winding drum shaft to rotate therewith upon unwinding rotation of the shaft, a brake band within the brake drum supported at each end on an eccentric mounting and adjustable to move the band toward and away from the drum, screw mechanism coupled with the eccentric mounting at one end of the band operable to adjust the position of the band with respect to the drum, and manually operable lever mechanism coupled with the eccentric mounting for the opposite end of the band operable to move the same toward or away from the drum and to be set at determined adjusted positions.

6. In a fishing reel, a framework, a winding drum having a shaft journalled thereupon, winding mechanism including a handle coupled with the shaft to wind the drum, a brake drum associated with the shaft, mechanism automatically operable to couple the brake drum to rotate with the shaft during its rotation of unwinding but ineffective to accomplish such coupling upon rotation of winding, a brake band within the drum supported at each end upon a rotatable eccentric mounting, an adjustment coupled with one eccentric mounting to adjustably position the end of the band, and a hand lever coupled with the other eccentric mounting to adjustably position such end of the band.

7. In a fishing reel, a framework, a winding drum having a shaft journalled thereupon, winding mechanism including a handle and change speed gears coupled with the shaft to wind the drum, a brake drum coupled with the winding drum, a brake band within the brake drum, a rotatable eccentric pin for each end of the band supporting the band, a screw actuating adjustment associated with one of said pins to actuate it to position the band with respect to the drum, and hand lever mechanism associated with the other of said pins to actuate it to position the band with respect to the drum.

8. A fishing reel comprising, in combination, a frame, a winding drum having a shaft freely rotatably supported on the frame, a handle having a shaft rotatably supported on the frame, a train of change speed gears extending between the handle shaft and the winding drum shaft to rotate the winding drum, and selector means operable axially through the winding drum shaft to selectively couple any one of a plurality of said gears with the winding drum shaft to rotate therewith or to disengage said gears therefrom to permit the shaft to rotate independently of the gears.

9. In a fishing reel, a frame, a winding drum having a shaft journalled upon the frame, winding mechanism including a handle and change speed gears operable to couple the handle with the winding drum shaft to wind the same, selector mechanism controlling the coupling of said gears for driving engagement, a brake drum coupled with the winding drum, a brake band positioned within the brake drum, a support for said brake band including a rotatably supported eccentric pin carrying one end of the band, a lever operable to rotate said pin to move the band toward or away from the drum, and means supporting the opposite end of the band including a screw adjustment operable to vary the position of the band with respect to the drum.

10. A fishing reel comprising, in combination, a frame, a winding drum having a shaft freely rotatably supported on the frame, winding mechanism including a handle and change speed gear mechanism on one side of the frame operable to couple the handle with the winding drum shaft to wind the same, selector means movable along said winding drum shaft for selectively controlling the coupling of the gears in said change speed gear mechanism to vary the driving relationship between said handle and said winding drum or to disengage said gears to permit the winding drum to rotate independently of the handle, and manual control means for actuating said selector means disposed on the opposite side of the frame from said winding mechanism.

11. In a fishing reel, a frame, a winding drum journalled upon the frame, winding mechanism for said winding drum including a handle, a brake drum coupled with the winding drum, an internal expanding brake band positioned within the brake drum and extending substantially around the circumference thereof in substantially concentric relation thereto, the ends of said band lying in substantial proximity to one another, a hand brake lever movably supported on said frame, means operatively coupling said lever with one end of said brake band and adapted upon movement of the lever in one direction to expand the brake band into frictional engagement with the drum, a support on said frame for the other end of the brake band, and screw means for bodily shifting said support with respect to the drum to vary the position of the brake band relative to the drum, said lever and said screw means being in proximity to one another by reason of the proximity of the brake band ends.

WALTER D. MARR.